United States Patent [19]

Kruger et al.

[11] Patent Number: 4,559,283
[45] Date of Patent: Dec. 17, 1985

[54] BATTERY CASING

[75] Inventors: Franz J. Kruger, Half Moon Bay; Laszlo Szalvay, San Carlos, both of Calif.

[73] Assignee: Raychem Corporation, Menlo Park, Calif.

[21] Appl. No.: 642,865

[22] Filed: Aug. 21, 1984

[51] Int. Cl.[4] ............................................ H01M 2/08
[52] U.S. Cl. .................................... 429/174; 429/181; 429/185
[58] Field of Search ................ 429/174, 181, 184, 185

[56] References Cited

U.S. PATENT DOCUMENTS 3,753,700  8/1973  Harrison et al. ..................... 148/402
4,258,108  3/1981  Glaser ............................. 429/174 X
4,263,380  4/1981  Riedl .............................. 429/174 X Primary Examiner—Charles F. LeFevour
Attorney, Agent, or Firm—Ira D. Blecker; Gene Dillahunty; Herbert G. Burkard

[57] ABSTRACT

Disclosed is a battery casing comprising a diametrical can, a recoverable sealing ring, sealing material and a central member. The diametrical can has a flange portion which defines a can opening to be sealed. The can opening is filled by insertion of the central member and sealing material into the can opening. The recoverable sealing ring, which surrounds the flange portion, applies a compressive force so as to decrease the space between the flange portion, sealing material and central member and seal the can opening.

7 Claims, 7 Drawing Figures

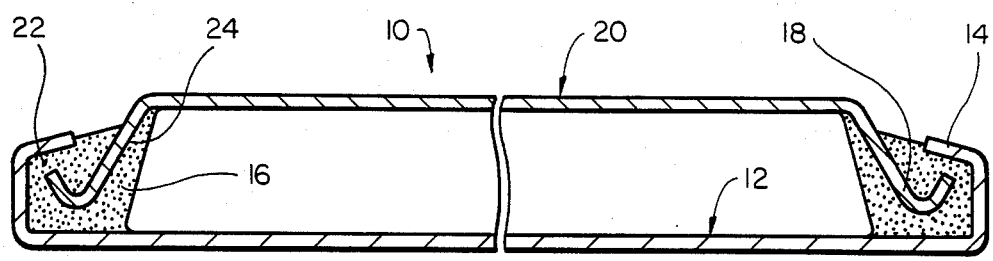
FIG_1
(PRIOR ART)
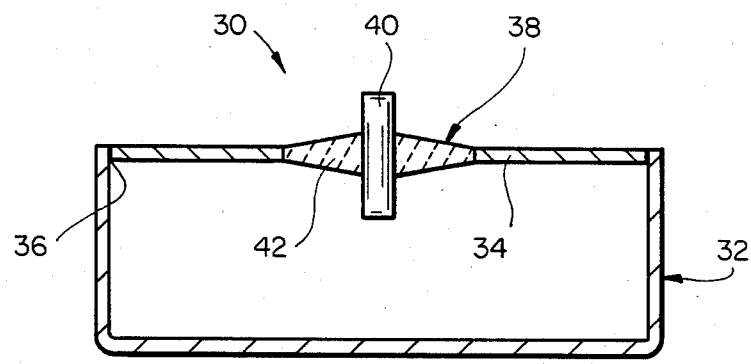
FIG_2
(PRIOR ART)

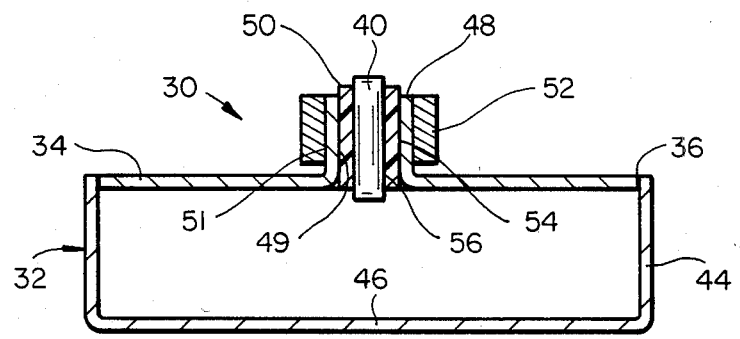
FIG_3
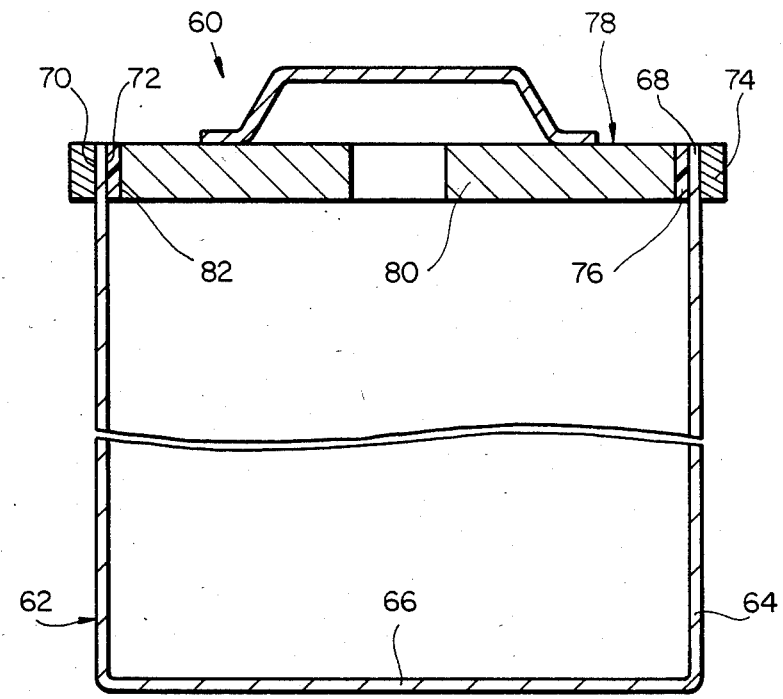
FIG_4

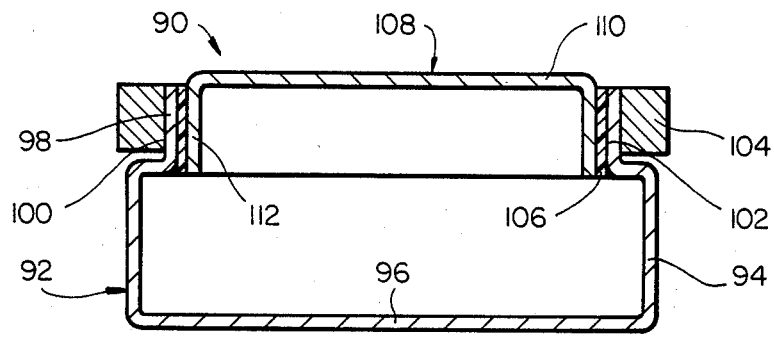
FIG_5
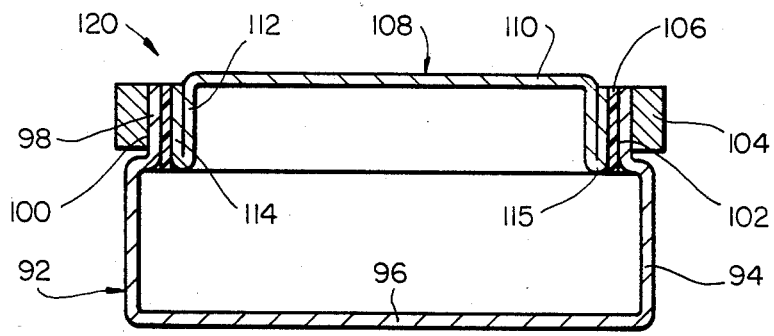
FIG_6
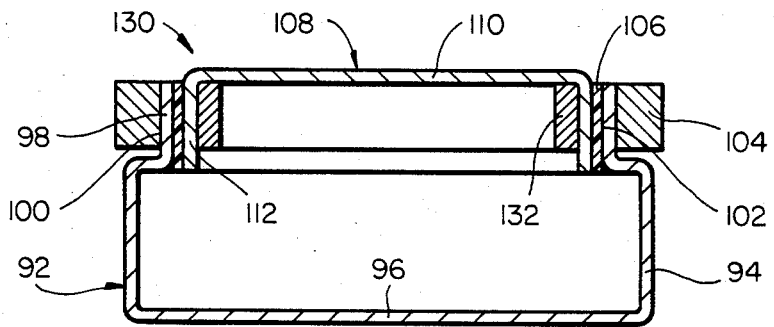
FIG_7

BATTERY CASING

BACKGROUND OF THE INVENTION

The present invention relates to the field of batteries and, more particularly, to button cells and cylindrical batteries.

A problem common to button cells and cylindrical batteries is electrolyte leakage prior to the normal end of their useful life. In other words, the useful life of these batteries is often prematurely terminated due to electrolyte leakage.

The consequences of electrolyte leakage are twofold. The first is that, since the batteries are not used to their full working life, the net cost of the battery increases. The second is that electrolyte leakage can damage expensive equipment.

While it would be desirable to eliminate electrolyte leakage from batteries, the problem of electrolyte leakage remains largely unsolved.

The battteries with which this invention is most concerned are sealed in two ways. One type of seal, commonly used for alkaline batteries, is a crimp seal. In a crimp seal, a flange on the outer part of the battery can is crimped over an edge of the cap. Sealing material is interposed between the flange and the cap so as to seal the battery can and also to help prevent electrolyte leakage.

After the crimping force is removed, there is a certain amount of springback of the flange material. On a stress/strain curve, this springback would coincide with the elastic strain portion which is removed upon removal of the stress. Once springback occurs, pressure on the sealing material is relieved to a certain extent. This allows the phenomenon of electrolyte creep to begin. In this regard, see "Electrolyte Creep in Galvanic Cells/ I. Contribution to the Phenomena", H. W. Nientiedt, *Journal of Power Sources,* 8(1982) 257–265. Eventually there is electrolyte leakage.

The second type of seal is a glass-to-metal or ceramic-to-metal seal. In this seal, an opening in the cap is filled by glass or ceramic and an electrode. The glass or ceramic, besides holding the electrode in place, serves also to insulate the electrode from the remainder of the can.

The glass-to-metal or ceramic-to-metal seal is frequently used in conjunction with lithium batteries but may also be used with alkaline batteries. In either situation the glass or ceramic suffers from chemical attack which leads to degradation of the seal and subsequent failure of the battery. Failure of the battery here may be by electrolyte leakage, as with the crimp seal, or it may be by the formation of a conductive layer on the glass or ceramic leading to a shorting out of the battery. In this regard, see "Glass/Ceramic/Metal Seals for Battery Applications", Topping et al , *Journal of the Canadian Ceramic Society,* 45(1976) 1–4; and "Glass-to-Metal Seal Corrosion in Lithium-Sulphue Dioxide Cells", Bunker et al., *Power Sources,* 8(1981) 53–62.

It is apparent that an improved battery seal would be desirable.

The present invention proposes the use of a heat recoverable, or more preferably a shape memory alloy, element as an essential part of the battery casing. It is believed that the proposed use of the heat recoverable element or the preferred shape memory alloy element will result in an improved battery seal.

Materials, both organic and metallic, capable of being rendered heat recoverable are well known. An article made of such materials can be deformed from an original, heat-stable configuration to a second, heat-unstable configuration. The article is said to be heat recoverable for the reason that, upon the application of heat alone, it can be caused to revert, or to attempt to revert, from its heat-unstable configuration to its original, heat-stable configuration.

Among metallic alloys, the ability to possess shape memory is a result of the fact that the alloy undergoes a reversible transformation from an austenitic state to a martensitic state with a change in temperature. This tranformation is sometimes referred to as a thermoelastic martensitic transformation. An article made from such an alloy, for example a hollow sleeve, is easily deformed from its original configuration to a new configuration when cooled below the temperature at which the alloy is transformed from the austenitic state to the martensitic state. The temperature at which this transformation begins is usually referred to as $M_s$ and the temperature at which it finishes $M_f$. When an article thus deformed is warmed to the temperature at which the alloy starts to revert back to austenite, referred to as $A_s$ ($A_f$ being the temperature at which the reversion is complete) the deformed object will begin to return to its original configuration.

Various proposals have been made to employ shape memory alloys but, it is believed, none have encompassed the use of shape memory alloys to seal a battery casing.

In view of the above, it is an object of this invention to have a battery casing with an improved seal.

Another object of the invention is to have a battery casing with an improved seal that employs a heat recoverable element.

A further object of the invention is to have a battery casing with an improved seal that is simple in design and economical to produce.

These and other objects of the invention will become apparent after reference to the following description considered in conjunction with the accompanying figures.

BRIEF SUMMARY OF THE INVENTION

The purpose of this invention is to provide a battery casing having an improved seal to prevent electrolyte leakage.

To this end, there is disclosed a battery casing comprising a diametrical can having a flange portion which defines a can opening to be sealed. The battery casing further comprises a recoverable sealing ring, sealing material and a central member. The central member is inserted into the can opening. Sealing material is interposed between the flange portion and the central portion. The recoverable sealing ring, upon recovery, applies a compressive force so as to decrease the space between the flange portion, sealing material and central member.

BRIEF DESCRIPTION OF THE DRAWINGS

FIG. 1 is a sectional view of the prior art crimping method of sealing a button cell.

FIG. 2 is a partial sectional view of the prior art glass-to-metal seal.

FIG. 3 is a partial sectional view similar to FIG. 2 but in which the glass-to-metal seal is replaced by a first embodiment of the invention.

FIG. 4 is a sectional view of a cylindrical battery illustrating a second embodiment of the invention.

FIG. 5 is a sectional view of a button cell illustrating a third embodiment of the invention.

FIG. 6 is a sectional view of a button cell similar to FIG. 5 but illustrating a fourth embodiment of the invention.

FIG. 7 is a sectional view of a button cell similar to FIG. 5 but illustrating a fifth embodiment of the invention.

DETAILED DESCRIPTION OF THE INVENTION

Referring to the Figures in more detail and particularly referring to FIGS. 1 and 2, there are shown two prior battery sealing techniques. FIG. 1 illustrates a prior art button cell 10 sealed by crimping. Can 12 has a flange 14 which is crimped over sealing material 16 and edge 18 of cap 20. When flange 14 is first crimped, there is substantial pressure applied with the greatest pressure indicated at 22. Away from 22, the pressure would lessen. When the crimping force is removed, there will be elastic springback of flange 14 with a corresponding decrease in the pressure applied to the sealing material 16. Eventually, the electrolyte can creep along the wall 24 of the cap 20 and escape from the cell.

FIG. 2 illustrates a prior art cylindrical battery 30 with a glass-to-metal seal. In this battery, the can 32 has a top 34 welded 36 onto it. There is a glass-to-metal seal, indicated generally by 38, comprising an electrode 40 situated in a glass button 42. A ceramic-to-metal seal would be similar to this glass-to-metal seal except that ceramic replaces the glass. Whether glass or ceramic, the lithium (if it be a lithium battery) or the caustic (if it be an alkaline battery) tend to react adversely with the glass or ceramic. Eventually, the seal degrades to the point where the battery fails.

It is believed that the sealing problems of the prior art batteries can be solved by the battery casing of the present invention.

According to the invention, there is disclosed a battery casing comprising a diametrical can, a recoverable sealing ring, sealing material, and a central member. The diametrical can has a side, a bottom transverse to the side and a flange portion transverse to the bottom. The flange portion of the can has an outer periphery and an inner periphery with the inner periphery defining a can opening to be sealed. The central member is inserted into and substantially fills the can opening. The sealing material is positioned between the central member and the inner periphery of the flange portion. The recoverable sealing ring is positioned so it surrounds the outer periphery of the flange portion so that upon recovery of the sealing ring, a compressive force is applied by the sealing ring. This compressive force decreases the space between the flange position, sealing material and central member so as to seal the battery casing.

Referring to FIG. 3, there is shown the cylindrical battery 30 of FIG. 2 except the glass-to-metal seal 38 has been replaced by an arrangement according to the present invention. In FIG. 3 now, the diametrical can 32 has a side 44 and a bottom 46. In general, the diametrical can has a cup-shaped configuration and is circular in crossection. The cap 34 of the can is welded 36 to the side as in FIG. 2. In FIG. 3, however, there is a flange portion 48 generally transverse to the bottom 46 and, in this particular embodiment, is also transverse to the cap 34. The flange portion 48 has an inner periphery 49 and an outer periphery 51. The central member 40 in this embodiment is an electrode.

Interposed between the electrode 40 and the flange 48 is sealing material 50, which may be any of the well-known materials such as nylon 66, polypropylene or polyimide.

Surrounding the flange 48 is recoverable sealing ring 52. A "recoverable" article is one whose dimensional figuration may be made to change when subjected to an appropriate treatment. For purposes of this description of the invention a "recoverable" article should be understood to mean that the article recovers toward an original shape from which it has been previously deformed. Usually, recovery will take place upon the application of heat.

It is preferred that the recoverable sealing ring be made from a shape memory alloy. The particular shape memory alloy is not important so long as the alloy is not martensitic in the anticipated temperature operating range.

For purposes of illustration, and not of limitation, shape memory alloys such as those in Harrison et al. U.S. Pat. No. 3,753,700 will achieve the objects of the invention.

While shape memory alloys are preferred, it is also contemplated within the scope of the invention that the recoverable sealing ring material may be made from a high recovery force polymer.

It is believed that the use of the shape memory alloy sealing ring in conjunction with the design details illustrated in FIG. 3 will lead to a reliable leak-tight seal. This is primarily due to the greater compressive forces that can be developed with shape memory alloys. Since there is no glass or ceramic, there are no corrosion problems. Overall, the design is simpler and cheaper than the glass-to-metal or ceramic-to-metal seal.

Still referring to FIG. 3, a first contact surface 54 is formed between the inner periphery 49 of the flange portion and the sealing material 50 and a second contact surface 56 is formed between the sealing material and the central member 40. The pressure gradient across the sealing material, that is, between the first contact surface 54 and the second contact surface 56, is the same at any two adjacent locations on the sealing material. In other words, the shape memory alloy sealing ring exerts uniform pressure along the whole length of the sealing material. This uniform pressure serves to promote the leak-tight seal.

Referring now to FIG. 4, there is disclosed another embodiment of the invention. Illustrated in this embodiment is a cylindrical battery casing 60. There is a diametical can 62 having a side 64, a bottom 66 transverse to the side and a flange portion 68 transverse to the bottom. In this embodiment, the flange portion 68 is an extension of the side 64 of the can. The flange portion 68 has an outer periphery 70 and an inner periphery 72. The inner periphery, as in the previous embodiments, defines an opening to be sealed.

The battery casing further comprises a recoverable sealing ring 74, sealing material 76, and a central member 78. In this particular embodiment, the central member is a cap. The cap has a diametrical portion 80 and a side surface 82 transverse to the diametrical portion.

The cap is inserted into and substantially fills the can opening. The cap has its diametical portion 80 facing the bottom 66 of the can and its side surface 82 facing the flange portion 68 of the can. The sealing material 76 is positioned between the cap and the inner periphery 72 of the flange portion. The recoverable sealing ring 74 surrounds the outer periphery 70 of the flange portion so that upon recovery of the sealing ring, a compressive force is applied by the sealing ring so as to decrease the space between the flange portion, sealing material and cap. Thus, the casing becomes sealed.

It is preferred that the recoverable sealing ring be made from a shape memory alloy.

A battery casing, as illustrated in FIG. 4, could replace a battery casing sealed by crimping. In this situation, the instant invention has a great advantage over the prior art design in that uniform pressure is applied along the entire length of the sealing material. Also due to the greater applied forces possible with the shape memory alloy sealing ring, it is expected that electrolyte creep can be effectively reduced or eliminated.

Referring now to FIG. 5, there is illustrated a further embodiment of the invention. The battery casing 90 in FIG. 5 is for a button cell and is meant to replace the prior art crimped battery casing of FIG. 1.

According to the invention, there is disclosed a battery casing 90 comprising a diametrical can 92, a recoverable sealing ring 104, sealing material 106, and a central member 108.

The diametrical can 92 has a side 94, a bottom 96 transverse to the side and a flange portion 98 transverse to the bottom 96. The flange portion 98 has an outer periphery 100 and an inner periphery 102. The inner periphery 102 defines a can opening to be sealed.

In this embodiment, the central member is a cap having a diametrical portion 110 and a flange portion 112 transverse to the diametrical portion. The cap is inserted into and substantially fills the can opening. When inserted into the can opening, the cap has its diametrical portion 110 facing the bottom 96 of the can and its flange portion 112 facing the flange portion 98 of the can.

The sealing material 106 is positioned between the cap flange portion 112 and the inner periphery 102 of the can flange portion 98. The recoverable sealing ring 104 surrounds the outer periphery 100 of can flange portion 98 so that upon recovery of the sealing ring, a compressive force is applied by the sealing ring so as to decrease the space between the can flange portion 98, the sealing material 106 and the cap flange portion 112. The battery casing thus becomes effectively sealed.

Preferably, the recoverable sealing ring is made from a shape memory alloy. Alternative, but less preferred, materials are high recovery force polymers.

The recoverable sealing ring will provide a uniform compressive force which translates into uniform maximum pressure applied against the sealing material along the whole length of the sealing material. In the prior art crimping design illustrated in FIG. 1, maximum pressure is applied only at relatively small area 22 and decreases away from area 22. Once the crimping force is removed, the applied pressure throughout the sealing material 16 will be relieved a certain amount, as explained earlier. In the instant invention, there is no decrease in the applied pressure once the compressive force is removed since the compressive force applied by the recoverable sealing material is never removed. The result of the instant invention is an improved seal which should prevent electrolyte creep, a major cause of electrolyte leakage in button cells.

A further embodiment of the invention is illustrated in FIG. 6. The button cell battery casing 120 of FIG. 6 is identical to the battery casing 90 of FIG. 5 except for the cap flange portion 112. The cap is constructed of a sheet material having a certain predetermined thickness. The predetermined thickness will be dictated by design requirements well known to those skilled in the art. These design requirements are not material to the scope of the instant invention. In the FIG. 6 embodiment, the cap flange portion 112 will have the sheet material bent over on itself so as to be of a thickness greater than the predetermined thickness. Thus, the cap flange portion 112 of FIG. 6 will actually comprise segment 114 bent at 115 onto segment 112. The effect of increasing the flange thickness is to provide greater stiffness to the cap so that greater compressive forces can be applied by the recoverable sealing ring. Of course, it is contemplated within the scope of the invention that the cap flange portion 112 may comprise more than the two segments 112 and 114, especially where extraordinary sealing requirements must be met.

Another embodiment of the invention is illustrated in FIG. 7. The battery casing 130 of FIG. 7 is identical to battery casing 90 of FIG. 5 with the exception that battery casing 130 further comprises reinforcing ring 132. The reinforcing ring 132 is located within the cap so as to be surrounded by the cap flange portion 112. The reinforcing ring serves to resist the compressive force applied by the sealing ring. In other words, the reinforcing ring more or less acts as a backstop or stationary point. When the compressive force of the recoverable sealing ring is applied, substantially the entire compressive force will be applied to compressing the can flange portion, sealing material, and cap flange portion together. None of the compressive force will be wasted in the inward deflection of the cap flange portion, which might occur in the absence of the reinforcing ring. Further, by making the reinforcing ring sufficiently stiff, the compressive force of the recoverable sealing ring can be increased so that extraordinary sealing forces may be developed.

It will be obvious to those skilled in the art, having regard to this disclosure, that other modifications of this invention beyond those embodiments specifically described here, may be made without departing from the spirit of the invention. Accordingly, such modifications are considered to be within the scope of the invention as limited solely by the appended claims.

We claim:

1. A battery casing comprising:
   a diametrical can having a side, a bottom transverse to the side and a flange portion transverse to the bottom, the flange portion having an outer periphery and an inner periphery, the inner periphery defining a can opening to be sealed;
   a recoverable sealing ring;
   sealing material; and
   a central member;
   the central member being inserted into and substantially filling the can opening, the sealing material positioned between the central member and the inner periphery of the flange portion, and the recoverable sealing ring surrounding the outer periphery of the flange portion so that upon recovery of the sealing ring, a compressive force is applied by the sealing ring so as to decrease the space between the flange portion, sealing material and central member and seal the casing, wherein a first contact surface is formed between the inner periphery of the flange portion and the sealing material and a second contact surface is formed between the sealing material and the central member, the pressure gradient across the sealing material between the first contact surface and the second contact surface being the same at any two adjacent locations on the sealing material.

2. The battery casing of claim 1 wherein the recoverable sealing ring is made from a shape memory alloy.

3. The battery casing of claim 1 wherein the central member is an electrode.

4. The battery of claim 1 wherein the central member is a cap having a diametrical portion and a side surface transverse to the diametrical portion, the cap when inserted into the can opening having its diametrical portion facing the bottom of the can and its side surface facing the flange portion of the can.

5. The battery casing of claim 1 wherein the central member is a cap having a diametrical portion and a flange portion transverse to the diametrical portion, the cap when inserted into the can opening having its diametrical portion facing the bottom of the can and its flange portion facing the flange portion of the can.

6. The battery casing of claim 5 wherein the cap is constructed of a sheet material having a predetermined thickness, the flange portion having the sheet material bent over on itself so as to be of a thickness greater than the predetermined thickness.

7. The battery casing of claim 5 further comprising a reinforcing ring located within the cap so as to be surrounded by the flange portion of the cap, the reinforcing ring resisting the compressive force applied by the sealing ring.

* * * * *